United States Patent
Hwu et al.

(10) Patent No.: US 8,612,672 B1
(45) Date of Patent: *Dec. 17, 2013

(54) ADAPTIVE PHYSICAL ALLOCATION IN SOLID-STATE DRIVES

(75) Inventors: Gwoyuh Hwu, Cupertino, CA (US); Lau Nguyen, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,226

(22) Filed: Sep. 7, 2012

Related U.S. Application Data (63) Continuation of application No. 12/712,686, filed on Feb. 25, 2010, now Pat. No. 8,271,720.

(60) Provisional application No. 61/156,665, filed on Mar. 2, 2009.

(51) Int. Cl.
    *G06F 12/00* (2006.01)
    *G06F 12/04* (2006.01)

(52) U.S. Cl.
    USPC ........... 711/103; 711/154; 711/157; 711/167; 711/168; 711/203

(58) Field of Classification Search
    USPC .......................................... 711/103, 115, 165
    See application file for complete search history.

(56) References Cited

U.S. PATENT DOCUMENTS

| | | | |
|---|---|---|---|
| 7,383,362 B2 | 6/2008 | Yu et al. | |
| 2009/0077305 A1 | 3/2009 | Shin et al. | |
| 2010/0125695 A1 | 5/2010 | Wu et al. | |
| 2012/0011335 A1 | 1/2012 | Asnaashari et al. | |

*Primary Examiner* — John Lane (57) ABSTRACT

A solid-state drive, a solid-state drive access unit allocation/data storage approach, and a solid-state drive access unit access/data retrieval approach are described that improve the efficiency with which data, that has been stored to the solid-state drive in association with a series of logical block addresses, can be retrieved from the solid-state drive. The described access unit allocation approach assures that data stored in the solid-state drive in association with a sequential series of logical block addresses is stored and maintained in solid-state drive access units, i.e., addressable units of solid-state drive memory that allow parallel read access to the data via parallel memory access I/O channels internal to the solid-state drive. In this manner, the time required to retrieve data associated with a sequential series of logical block addresses from corresponding access units within the solid-state drive is reduced.

20 Claims, 5 Drawing Sheets

ADAPTIVE PHYSICAL ALLOCATION IN SOLID-STATE DRIVES

INCORPORATION BY REFERENCE

This is a continuation of U.S. patent application Ser. No. 12/712,686, filed on Feb. 25, 2010, which application claims the benefit of U.S. Provisional Application No. 61/156,665, "ADAPTIVE PHYSICAL ALLOCATION IN HIGH PERFORMANCE SSD," filed by Gwoyuh Hwu, Lau Nguyen and Yunkun Fan on Mar. 2, 2009, which is incorporated herein by reference in its entirety.

BACKGROUND

A solid-state drive (SSD) is a data storage device that uses non-volatile solid-state memory to store persistent digitally encoded data. A solid-state drive can be configured to emulate a hard disk drive, i.e., a device that stores persistent digitally encoded data on the magnetic surfaces of rapidly rotating platters, and can be used to replace a hard disk drive in many applications.

A data-source/data-sink device writes data to, and reads data from, a persistent storage device. Logical block addresses are used to identify storage locations within the persistent storage device. The logical block addresses indicate which data is to be written and/or to identify storage locations within the persistent storage device from which data is to be read. Such logical block address (LBA) based addressing schemes are generic in nature and do not take into account considerations specific to the respective persistent storage device in use. Therefore, a persistent storage device, whether it is a hard disk drive, or a solid-state drive, typically includes an interface that translates received logical block addresses to storage device specific addresses, and vice versa.

In the case of a solid-state drive, the smallest addressable unit of memory is called an access unit. For example, a single solid-state drive access unit address may point to a physical location of solid-state memory that can store, for example, 4 kilobytes (KB) of data. Therefore, an SSD external interface must translate a logical block address (LBA) based address received in a write instruction or a read instruction to a SSD access unit based address before the received instruction can be acted upon. Further, in the case of a read instruction, the solid-state drive formats data retrieved from the respective access units in a manner consistent with the LBA-based addressing scheme prior to returning the retrieved data to a requesting device.

Solid-state drives do not have a spinning magnetic platter or actuator arm as used in hard disk drives. Therefore, solid-state drives are more rugged than hard disk drives and do not have the same operational delays. For example, unlike a hard disk drive, in a solid-state drive, there is no seek time associated with moving the actuator arm over a cylinder associated with a logical block address. Further, unlike a hard disk drive, in a solid-state drive there is no latency associated with rotating a platter to a physical sector/block of data beneath the actuator arm once the actuator arm has positioned itself over a cylinder associated with a logical block address. Because there is no such mechanical movements or delays, solid-state drives typically enjoy low access time, low latency, and low power consumption.

In addition, a solid-state drive typically includes multiple I/O channels that can be operated concurrently, i.e., in parallel, to write data to, or read data from the solid-state memory included in the solid-state drive. Each I/O channel is capable of independently writing and/or reading data from addressable access units that are assigned to the channel, one addressable access unit at a time. Therefore, a write/read strategy that stores data across access units that are assigned to different I/O channels can reduce the latency of write operations by using multiple I/O channels in parallel to write the data to solid-state memory, and can reduce the latency of read operations by using multiple I/O channels in parallel to read the stored data from the solid-state memory. Using such an approach, data received via a high-speed external interface from an external data-source/data-sink device, can be quickly written to the solid-state memory included in the solid-state drive. Further, data requested by an external data-source/data-sink device, can be quickly retrieved from the solid-state memory included in the solid-state drive via the parallel I/O channels, and delivered to the external data-source/data-sink device via the high-speed external interface.

However, one drawback associated with solid-state drives is that once an access unit has been written to, the same access unit cannot be written to again until the access unit has been erased. Further, an SSD erase operation requires more time than is required for an SSD access unit write operation and more time than is required for an SSD access unit read operation. In addition, many solid-state drives cannot erase a single SSD access unit, but must erase a group of multiple SSD access units that form a smallest unit of memory that can be erased by the solid-state drive, referred to as an SSD erasable unit. Therefore, not only will an SSD erase operation introduce significant operational delay, an SSD erase operation may require valid data from surrounding SSD access units within the same SSD erasable unit to be moved prior to the erase operation, or be lost.

As a result of the heavy delay penalties associated with erasing SSD access units, solid-state drives do not execute overwrite instructions in the same manner as a hard disk drive. For example, in response to an instruction from an external data-source/data-sink device to overwrite a portion of previously stored data, a solid-state drive may, instead of erasing and re-writing data in a set of SSD access units, write the modified data to a new set of one or more SSD access units and may then mark the previously written SSD access units as being invalid. Although such an approach requires the use of additional SSD access units, the approach avoids delays that would otherwise be associated with erasing and then rewriting the previously written SSD access units. Further, once a sufficient number of invalidated SSD access units have accumulated, a periodic maintenance may be performed during idle processing cycles to erase and reclaim the invalidated SSD access units for reuse.

The approach used by a solid-state drive to perform data overwrite/modify operations can significantly impact the efficiency with which data can be retrieved from the solid-state drive in response to a read operation. A segment of data stored to a sequential series of access units is distributed evenly across the respective I/O channels and, therefore, can be accessed with a large degree of parallelism. Limited only by the number of I/O channels supported by the SSD, each access unit is concurrently accessible via separate I/O channels. However, after one or more overwrite operations, the data on the SSD can become highly fragmented. A segment of data that was originally distributed evenly across the respective I/O channels, is likely less optimally distributed across the respective I/O channels. Therefore, data which could originally have been retrieved via a single read request of the parallel I/O channels must instead be retrieved with multiple sequential read requests, thereby increasing the latency associated with reading the data segment from SSD storage.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

A solid-state drive, a solid-state drive access unit allocation/data storage approach, and a solid-state drive access unit access/data retrieval approach is described that improves the efficiency with which data is retrieved from the solid-state drive. The described access unit allocation approach assures that data is stored and maintained in solid-state drive access units that allow maximum parallel read access to the data via memory access I/O channels internal to the solid-state drive. In this manner, the time required to retrieve data associated with a sequential series of logical block addresses from corresponding access units within the solid-state drive is reduced.

In one embodiment, a data storage device is described that includes, a solid-state memory organized into a plurality of access units, each access unit associated with a predetermined solid-state memory address, and each access unit associated with a predetermined one of a plurality of I/O channels, an interface module that receives data from a data-source that specifies a storage location for the data in the data storage device using a logical block address, and a controller that controls a transfer of the data from the interface module to the solid-state memory via one or more of the plurality of I/O channels, the controller including, an alignment module that assigns portions of the received data to each of a plurality of access units such that each I/O channel is associated with a first portion of the received data before any I/O channel is associated with a second portion of the received data.

In a second embodiment, a method of overwriting data stored in a solid-state storage device is described that includes, receiving a write request from a data-source that contains a write data and a write address, determining an access unit in the solid-state storage device that corresponds to the write address, determining an I/O channel associated with the access unit, and writing the write data to a sequential series of cleared access units, the first access unit in the sequence of access units assigned to the determined I/O channel.

In a third embodiment, an end-user device that includes a data storage device that includes, a solid-state memory organized into a plurality of access units, each access unit associated with a predetermined solid-state memory address, and each access unit associated with a predetermined one of a plurality of I/O channels, an interface module that receives data from a data-source that specifies a storage location for the data in the data storage device using a logical block address, and a controller that controls a transfer of the data from the interface module to the solid-state memory via one or more of the plurality of I/O channels, the controller including, an alignment module that assigns portions of the received data to each of a plurality of access units such that each I/O channel is associated with a first portion of the received data before any I/O channel is associated with a second portion of the received data.

BRIEF DESCRIPTION OF THE DRAWINGS

Embodiments of a solid-state drive, a solid-state drive access unit allocation/data storage approach, and a solid-state drive access unit access/data retrieval approach that improve solid-state drive data write and data retrieval efficiency will be described with reference to the following drawings, wherein like numerals designate like elements, and wherein.

DETAILED DESCRIPTION OF EMBODIMENTS

Figure 1:
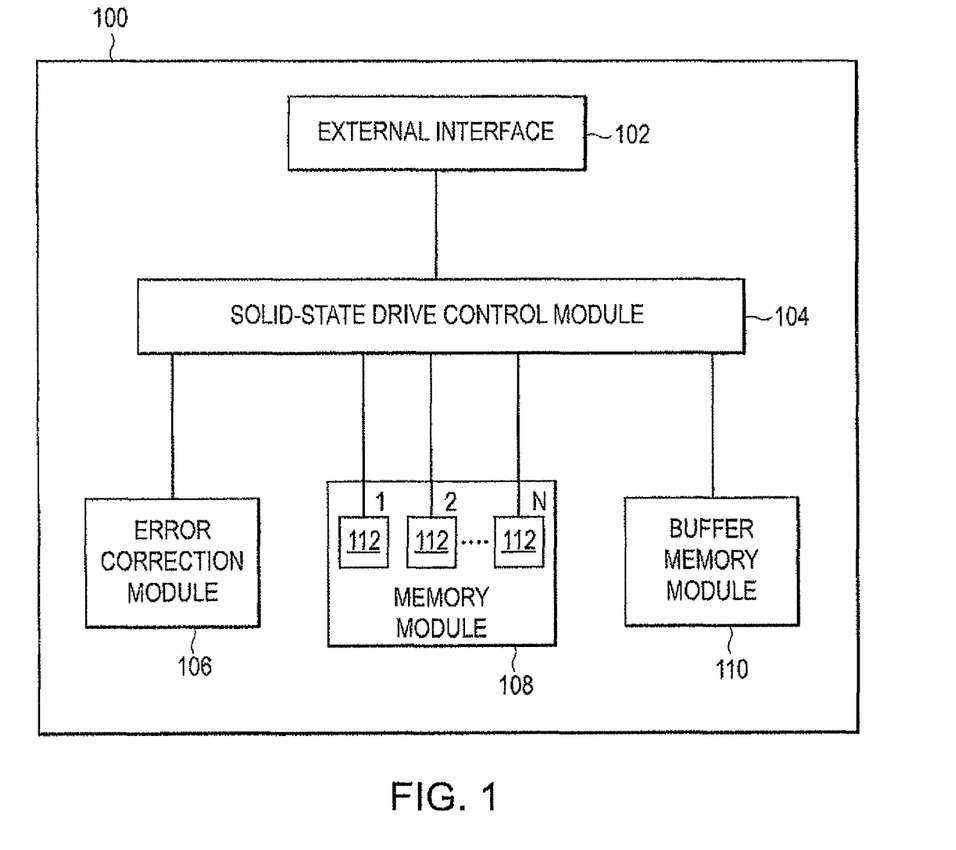
FIG. 1 is a block diagram of an solid-state drive architecture that includes embodiments of the described solid-state drive access unit allocation/data storage and access/data retrieval approach.

FIG. 1 is a block diagram of an example of a solid-state drive architecture that includes embodiments of the described solid-state drive access unit allocation/data storage and access/data retrieval approach. As shown in FIG. 1, solid-state drive 100 can include an external interface 102, a solid-state drive control module 104, an error correction module 106, a memory module 108, and a buffer memory module 110. As further shown in FIG. 1, memory module 108 can include one or more, e.g. 1 to N, memory integrated circuit units 112.

In operation, external interface 102, communicates with an external data-source/data-sink device via a physical interface using a predefined communication protocol to exchange data between solid-state drive 100 and the external data-source/data-sink device. For example, with respect to inbound traffic, external interface 102 receives commands, e.g., read, write, overwrite and/or erase commands, and related data, e.g., LBA-based addresses and data to be stored and/or rewritten, from an external data-source/data-sink device and presents the commands and related data to solid-state drive control module 104, e.g., via an inbound first-in-first-out (FIFO) buffer allocated from buffer memory module 110. With respect to outbound traffic, external interface 102 receives, e.g., via an outbound first-in-first-out (FIFO) storage buffer allocated from buffer memory module 110, command responses generated by solid-state drive control module 104 and/or data retrieved by solid-state drive control module 104 from memory module 108 and passes the data back to the corresponding external data-source/data-sink device from which the command was received.

For example, in one embodiment, the physical interface may be a Parallel Advanced Technology Attachment (DATA), Serial ATA (SATA), external SATA (ESATA), or Universal Serial Bus (USB) communication bus, etc., and the predefined communication data protocol may be, for example, the Advanced Technology Attachment protocol which is used to issue commands to the solid-state drive, such as read, write, and status.

Solid-state drive control module 104, receives command related data from the inbound FIFO buffer populated by external interface 102, parses the incoming commands and related data to extract command instructions and command parameters such as LBA-based addresses and write data, translates extracted LBA-based address to a corresponding SSD access unit address, and responds appropriately to the respective read, write, overwrite and/or status command instruction, as described in greater detail below with respect to FIG. 2 through FIG. 5. Solid-state drive control module 104 generates and provides to external interface 102, e.g., via an outbound first-in-first-out (FIFO) buffer allocated from buffer memory module 110, a reply message, e.g., a read response, a write acknowledgement or status update, in response to each received command. For example, a read response may contain read data retrieved from memory module 108 in response to a previously received read command. A write acknowledgment may contain an indication of whether a previously received write request was successful or aborted. A status update may include any information related to the status and/or configuration of solid-state drive 100 based on configuration, control and status parameters used by solid-state drive control module 104 to monitor the status of, and to control operation of solid-state drive 100.

Error correction module 106 performs error correction operations on data stored to memory module 108. In one embodiment, error correction module 106 is invoked by solid-state drive control module 104 to encode data received via external interface 102 with an error-correcting code (ECC) prior to storing received data in memory module 108. In such an embodiment, error correction module 106, is again invoked by solid-state drive control module 104 to perform error correction on data retrieved from memory module 108 based on the embedded ECC code. It is noted that performing such error correction in the solid-state drive is optional. For example, error correction may be implemented, for example, by the external source/sink device that originated the data stored to the solid-state drive. However, depending on the type of memory component used in memory module 108, such error correction may be useful within the solid-state drive as well. For example, such error correction may be used if memory module 108 is configured with multi-level cell (MLC) flash memory components that store more than one bit per memory cell by choosing between multiple levels of electrical charge to apply to the floating gates of its cells. Such MLC components can be more prone to data retrieval errors that other types of flash memory, such as single-level cell (SLC) flash memory components, in which each cell stores only one bit of information.

Memory module 108 includes one or more non-volatile memory storage components 112, e.g., single-level cell (SLC) flash memory components or multi-level cell (MLC) flash memory components or other type of persistent solid-state memory component, and provides solid-state drive control module 104 with read/write access to addressable access units within the non-volatile memory storage components 112 via one or more I/O channels. Each I/O channel has one or more data bit. In one embodiment, flash memory module 108 supports eight I/O channels with solid-state drive control module 104. These eight I/O channels may be operated in parallel to allow data to be written to or received from 8 access units simultaneously. Each I/O channel is capable of independently writing to and/or reading data from addressable access units that are assigned to the channel, one access unit at a time. Therefore, a write/read strategy that stores data across access units that are assigned to different I/O channels can reduce the latency of write operations by using multiple I/O channels in parallel to write the data to solid-state memory, and can reduce the latency of read operations by using multiple I/O channels in parallel to read the stored from solid-state memory, as addressed in greater detail below.

Buffer memory module 110 provides external interface 102 and solid-state drive control module 104 with random access memory that can be pre-allocated and/or dynamically allocated, as needed, by external interface 102, solid-state drive control module 104 and error correction module 106 in support of their respective operations. For example, in an embodiment that uses an inbound FIFO buffer and/or an outbound FIFO buffer to support read, write and status requests, as described above, the physical memory buffers used to implement the respective FIFO buffers may be allocated from buffer memory module 110. Buffer memory module 110 can also be used to provide external interface 102, solid-state drive control module 104 and/or error correction module 106 with random access memory for use in configuration, status and control parameters used to perform their respective functions.

Figure 2:
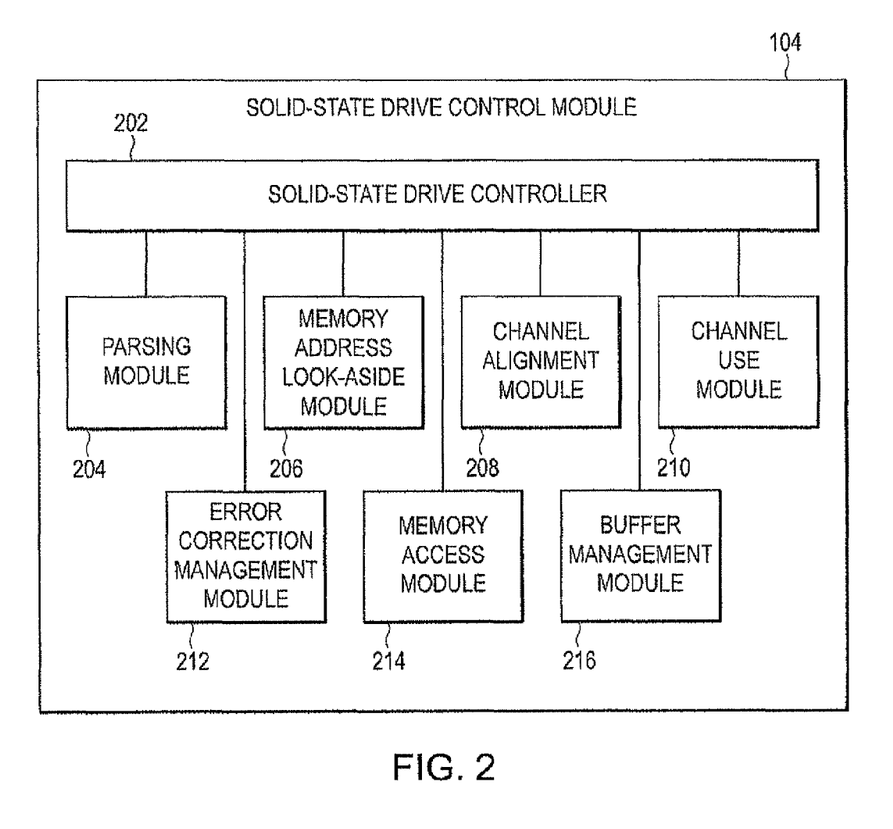
FIG. 2 is an embodiment of a solid-state drive control module shown in FIG. 1 that includes embodiments of the described solid-state drive access unit allocation/data storage and access/data retrieval approach.

FIG. 2 is an embodiment of a solid-state drive control module shown in FIG. 1 that includes examples of embodiments of the described solid-state drive access unit allocation/data storage and access/data retrieval approach. As shown in FIG. 2, solid-state drive control module 104 can include a solid-state drive controller 202, a parsing module 204, a memory address look-aside table 206, a channel alignment module 208, a channel use module 210, an error correction management module 212, a memory access module 214 and a buffer management module 216.

In operation, solid-state drive controller 202, maintains a set of static and/or dynamically updated control parameters that can be used by solid-state drive controller 202 to invoke the other modules included in solid-state drive control module 104 to perform operations, as described below, in accordance with the control parameters and a set of predetermined process flows, such as those described below with respect to FIG. 3 through FIG. 5. Solid-state drive controller 202 may communicate with and receive status updates from the respective modules within solid-state drive control module 104 to allow solid-state drive controller 202 to control operation of solid-state drive 100 in support of the respective process flows.

Parsing module 204 is invoked by solid-state drive controller to parse an incoming stream of command data received from external interface 102, to extract command instructions, command parameters and data. In one embodiment, once such data is located, parsing module 204 assigns a unique command identifier to the command instruction and stores the command instruction, related command parameters and data in a command instruction data store allocated from physical memory provided by buffer memory module 110, and notifies solid-state drive controller 202. Solid-state drive controller 202 may process the respective commands in the order in which they are received while a command is being executed. Solid-state drive controller 202 may track command execution related status and/or data retrieved from other modules within solid-state drive control module 104 and/or other modules within solid-state drive 100, such as error correction module 106 and I/O channels of memory module 108 using the unique identifier.

Memory address look-aside module 206 maintains a memory address look-aside table that maps LBA-based addresses for which data is being stored in memory module 108 to the addressable access units in memory module 108 containing the stored data. In one embodiment, memory address look-aside module 206 is invoked by solid-state drive controller 202 to translate a logical block address (LBA), e.g., such as an LBA received in a command instruction from an external data-source/data-sink device, to one or more corresponding addressable access units that are currently being used to store data associated with the LBA in memory module 108. For example, a read request may include an LBA address that corresponds to an LBA address used in a previously successful write command. The addresses of addressable access units within memory module 108 to which the data was written will be stored in the memory address look-aside table maintained by memory address look-aside module 206 and must be retrieved before solid-state drive controller 202 can retrieve the data from memory module 108.

Channel alignment module 208, is invoked by solid-state drive controller in response to receipt of a write command or an overwrite command from an external data-source/data-sink device. As described in greater detail below with respect to FIG. 3 through FIG. 5, channel alignment module 208 assures that data written to and/or over-written in memory module 108 is written in a manner that supports low latency access to the data via the use of parallel I/O channels. For example, as described above, solid-state drive control module 104 communicates with access units in memory module 108 via one or more I/O channels that can be operated in parallel. However, each parallel I/O channel can only be used to write to, or read from a single addressable access unit at a time. If a segment of data were to be stored in a single access unit or multiple access units associated with a single I/O channel, parallel access to the data via multiple I/O channels would not be possible. Therefore, to maximize parallel access to data stored across multiple addressable access units, channel alignment module 208, during both write and overwrite and/or partial overwrite operations, allocates contiguous portions of a data segment to addressable access units associated with I/O channels that can be accessed by solid-state drive controller 202 in parallel. Details related to a process by which such channel allocation and alignment can be performed is described below with respect to FIG. 3 and FIG. 4. Details related to a process by which a segment of data allocated across multiple I/O channels may be accessed in parallel to minimize read access latency is described below with respect to FIG. 5.

In one embodiment, channel alignment module 208 has access to an access channel lookup table that maps SSD access units to I/O channels. Such an access channel lookup table can be preconfigured during production of the SSD, or may be populated by the channel alignment module 208 at startup. In another embodiment, SSD access units are assigned to I/O channels in repeating sequential order, e.g., SSD access units 0 to 7 assigned to I/O channels 0 to 7, SSD access units 8 to 15 assigned to I/O channels 0 to 7, SSD access units N–7 to N assigned to I/O channels N–7 to N, etc., thereby allowing channel alignment module 208 to determine the I/O channel to which an SSD access unit is assigned base on a sequential order unique address associated with each respective SSD access unit.

Channel use module 210, is used by solid-state drive controller 202 to track addressable access units that have been written to and are in active use, i.e., are mapped to LBA's by the memory address look-aside table described above with respect to memory address look-aside module 206, to track addressable access units that have been written to but are no longer in active use, i.e., are no longer mapped to LBA's by the memory address look-aside table described above with respect to memory address look-aside module 206 but that have not been erased and, therefore, are not available to store data, and to track addressable access units that have been erased and that are available to store data. In one embodiment, channel use module 210 may maintain an access unit channel tracking table for each I/O channel. The access unit channel tracking table is used to track which addressable access units that have been written to and are in active use in association with a stored data segment, track which addressable access units that have been written too but are no longer in active use in association with a stored data segment, and track which addressable access units that have been erased and that are available to store data. For example, in an solid-state drive 100 that supports 8 parallel I/O channels to memory module every eighth addressable access unit may be assigned to the same I/O channel. In this manner, the addressable access units assigned to an I/O channel can be easily predicted, and the access unit channel tracking table for each I/O channel may contain entries for those addressable access units that have been written to and are in active use in association with a stored data segment, those addressable access units that have been written to but are no longer in active use in association with a stored data segment. Other addressable access units may be assumed to have been erased and available to store data.

Error correction management module 212 is invoked by solid-state drive controller 202 to manage communications with error correction module 106. In one embodiment, solid-state drive controller 202 instructs error correction management module 212 to generate an error correction code for each portion of a data segment prior to storing the portion of the data segment in an addressable access unit. The generated error correction code is stored along with the portion of the data segment in an allocated addressable access unit to which the portion of the data segment is stored. In such an embodiment, solid-state drive controller 202 further instructs error correction management module 212 to perform error correction on a portion of a data segment that has been retrieved from an addressable access unit in association with a read command using the error correction code previously generated for the data segment. In such a manner, solid-state drive controller 202 assures that each individually stored portion of a data segment has been error corrected prior to assembly of the data segment for delivery to an external data-sink/data-source device via external interface 102.

Memory access module 214 is invoked by solid-state drive controller 202 to manage I/O channel communications with memory module 108. As described above, latency associated with data reads from memory module 108 is reduced by breaking a data segment into one or more portions. These data segment portions may be written to, and read from, addressable access units via parallel I/O channel communications. In one embodiment, memory access module 214 is invoked by solid-state drive controller 202 to manage the communication exchanges with the one or more I/O channels needed to write a complete data segment to memory module 108 and/or to read a complete data segment to memory module 108. For example, in a write and/or overwrite operation, once solid-state drive controller 202 has invoked channel alignment module 208 and channel use module 210 to allocate a data segment across multiple addressable access units, solid-state drive controller 202 may invoke memory access module 214 to handle communication related to the write process via I/O channel connections to memory module 108. In a read operation, solid-state drive controller 202 may invoke memory access module 214 to retrieve the respective portions of a data segment. As memory access module 214 reports receipt of the respective portions of the data segment, solid-state drive controller 202 may invoke error correction management module to perform error correction on each portion of the data segment. Once the data retrieval and error correction processes are reported complete, solid-state drive controller 202 may assemble an outgoing command response for delivery to a data-source/data-sink device via external interface 102.

Buffer management module 216 is invoked by solid-state drive controller 202 to allocate, manage and dispose of memory buffers allocated from buffer memory module 110. Buffer management module 216 may manage the details associated with such memory allocations, so that the details related to dynamic allocations and de-allocations of memory are transparent to solid-state drive controller 202 and/or other modules within solid-state drive control module 104. As described above, physical memory from buffer memory module 110 may be used by external interface module 102, solid-state drive control module 104, and error correction module 106 to provide dynamically allocated physical memory for such uses as the dynamically allocated inbound FIFO buffer used to store data received by external interface 102 prior to processing of the data by solid-state drive control module 104, and for such uses as the dynamically allocated outbound FIFO buffer used to store command response generated by solid-state drive control module 104 prior to transmission of the command response to an external data-source/data-sink device via external interface 102. Similarly, solid-state drive controller may instruct buffer management module 216 to dynamically allocate and/or return physical memory resources to buffer memory module 110 for a wide range of internal command and control processes.

Figure 3:
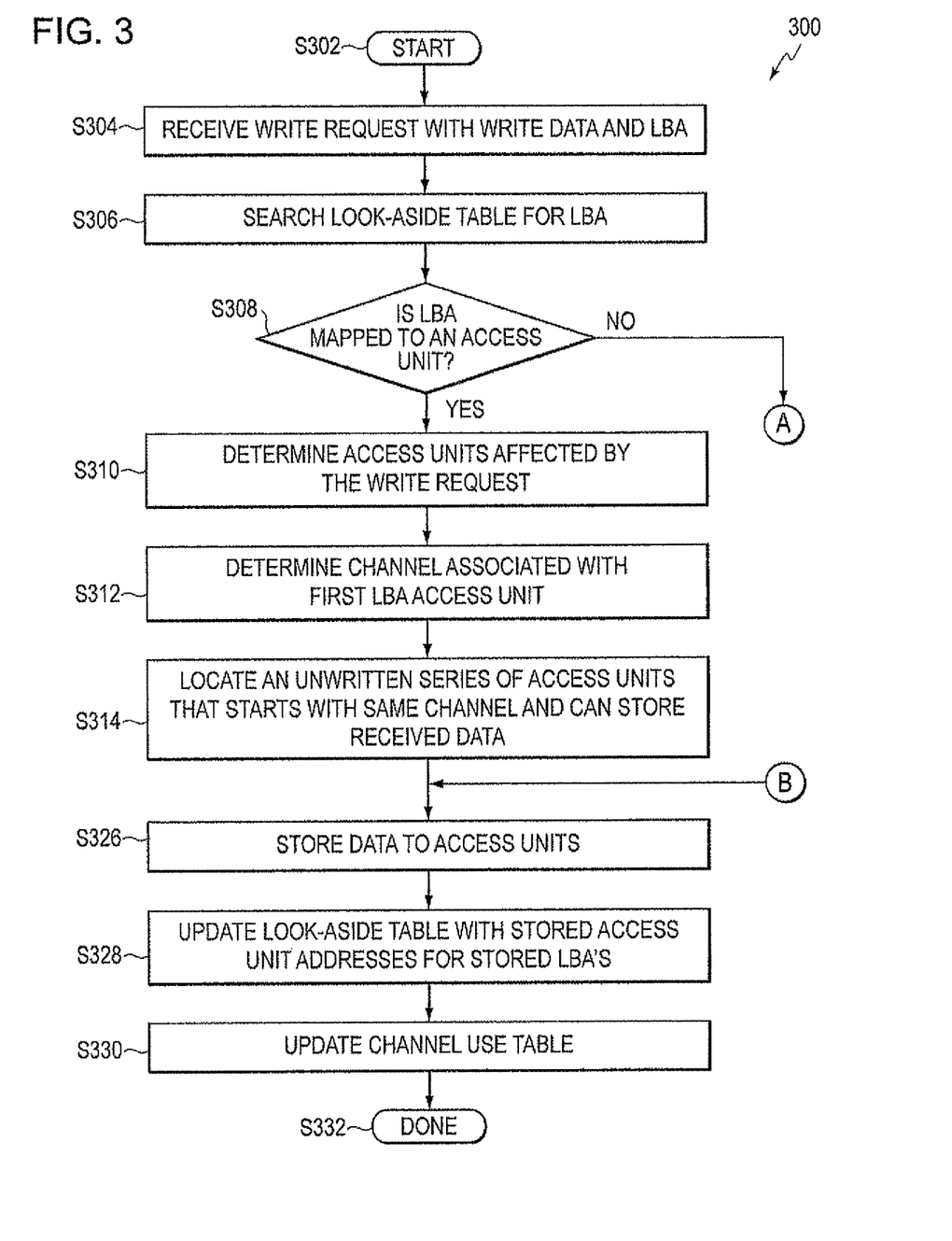
FIG. 3 and FIG. 4 are a flow-chart of an data write process that uses an embodiment of the described solid-state drive access unit allocation/data storage approach.
Figure 4:
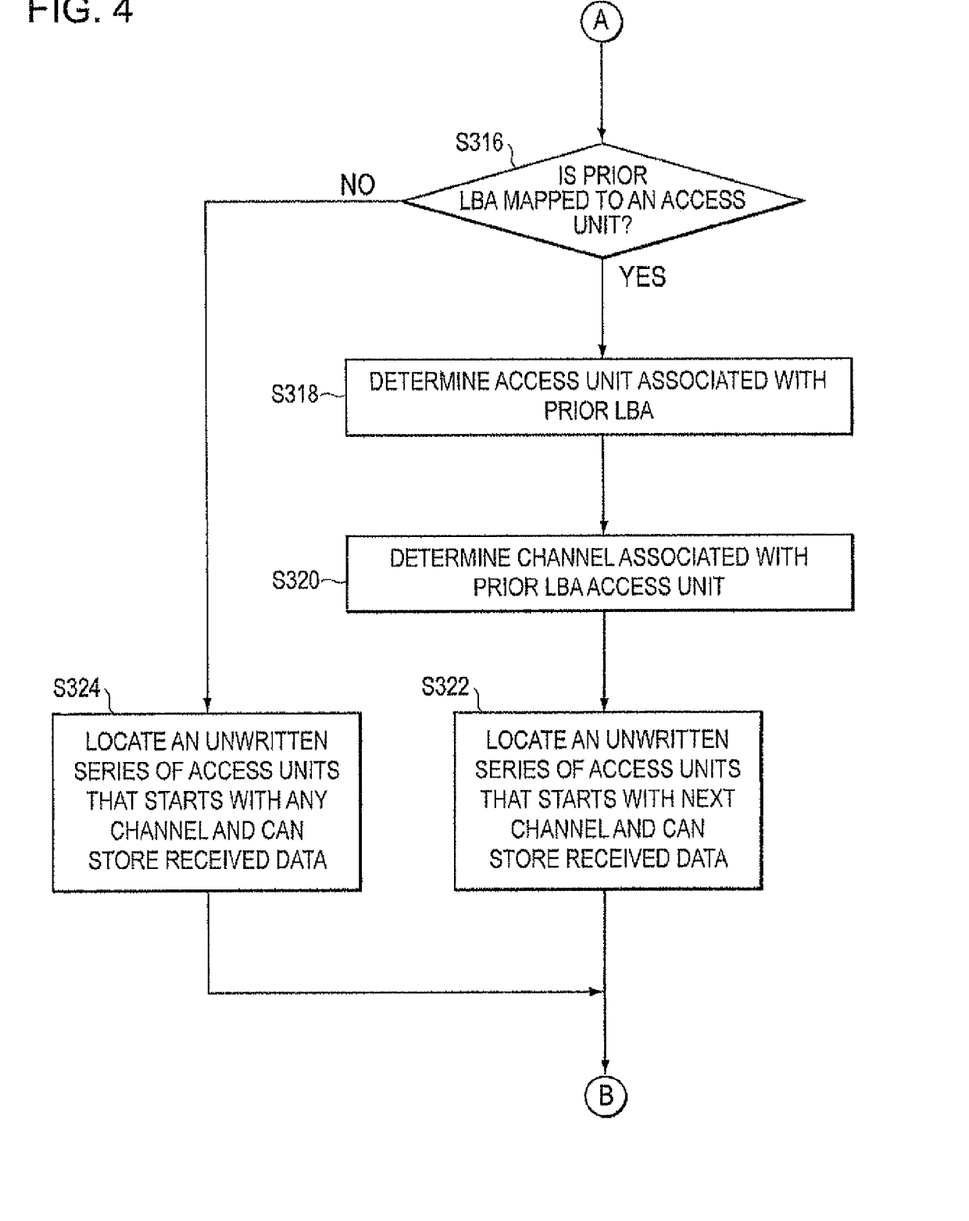

FIG. 3 and FIG. 4 are flow-charts of an example of a data write process that uses an embodiment of the described solid-state drive access unit allocation data storage approach. As shown in FIG. 3, operation of process 300 begins at S302 and proceeds to S304.

At S304, solid-state drive controller 202 receives an indication from parsing module 204 that a write request with a write-data segment and a logical block addresses write destination has been received, e.g., from an external data-source/data-sink device via external interface 102 and the inbound FIFO buffer, as described above, and operation of the process continues at S306.

At S306, solid-state drive controller 202 may instruct memory address look-aside module 206 to search the memory address look-aside table for the one or more received logical block addresses, and operation of the process continues at S308.

At S308, if memory address look-aside module 206 determines that logical block addresses is currently mapped to an addressable access unit that is actively in use to store current data, operation of the process continues at S310; otherwise, operation of the process continues at S316.

At S310, solid-state drive controller 202 invokes memory access module 214 to determine the access units that are currently in use whose contents will be affected by the current write request, and operation of the process continues at S312.

At S312, solid-state drive controller 202 invokes channel alignment module 208 to determine the I/O channel associated with the first logical block address affected by the write request, and operation of the process continues at S314.

At S314, solid-state drive controller 202 invokes channel alignment module 208 and channel use module 210 to locate an unwritten series of access units that can store the volume of data associated with the write request and that maximizes the number of I/O channels that are used in parallel during each track write process, i.e., the process of concurrently writing to one or more access units of the SSD via parallel I/O channels, to store the write-data in the respective access units. In one embodiment, channel alignment module 208 selects an unwritten series of access units that starts with an access unit associated with the same I/O channel determined at S312. The remaining access units are selected taking into account the I/O channel with which each access unit is associated. Access units, and the I/O channel associated with each, are selected such that each track write process writes to the SSD using one or more of the I/O channels available, e.g., up to a maximum available, up until the final track write that completes writing the data segment using a number of I/O channels required to complete writing the data segment to the SSD. This can be accomplished by channel alignment module 208 by selecting, for each track written, access units associated with different I/O channels, until each I/O channel is in use or the required number of I/O channels needed to complete writing the data segment to the SSD have been allocated. Once an appropriate set of one or more access units has been selected, and operation of the process continues at S326.

Returning now to discuss an alternate process flow starting at S308, if memory address look-aside module 206 determines at S308 that logical block addresses is not currently mapped to an addressable access unit that is actively in use to store current data, operation of the process continues at S316.

At S316, if memory address look-aside module 206 determines that the logical block address just prior to the first logical block address identified in the write request is currently mapped to an addressable access unit that is actively in use to store current data, operation of the process continues at S318; otherwise, operation of the process continues at S324.

At S318, solid-state drive controller 202 invokes memory address look-aside module 214 to determine the access unit associated with the prior logical block addresses determined at S316, and operation of the process continues at S320.

At S320, solid-state drive controller 202 invokes channel alignment module 208 to determine the I/O channel associated with determined prior logical block address, and operation of the process continues at S322.

At S322, solid-state drive controller 202 invokes channel alignment module 208 and channel use module 210 to locate an unwritten series of access units that can store the volume of data associated with the write request and that efficiently uses, e.g., increases and/or maximizes, the number of I/O channels that are used in parallel during each track write process, i.e., the process of concurrently writing to one or more access units of the SSD via parallel I/O channels, to store the write-data in the respective access units. In one embodiment, channel alignment module 208 selects an unwritten series of access units that starts with an access unit associated with a next I/O channel following the I/O channel determined at S312. The remaining access units are selected taking into account the I/O channel with which each access unit is associated. Access units, and the I/O channel associated with each, are selected such that each track write process writes to the SSD using the maximum number of I/O channels available, up until the final track write that completes writing the data segment using a number of I/O channels required to complete writing the data segment to the SSD. This can be accomplished by channel alignment module 208 by selecting, for each track written, access units associated with different I/O channels, until each I/O channel is in use or the required number of I/O channels needed to complete writing the data segment to the SSD have been allocated. Once an appropriate set of one or more access units has been selected, and operation of the process continues at S326.

Returning now to discuss an alternate process flow starting at S316, if memory address look-aside module 206 determines that the logical block addresses just prior to the first logical block address identified in the write request is not currently mapped to an addressable access unit that is actively in use to store current data, operation of the process continues at S324.

At S324, solid-state drive controller 202 invokes channel alignment module 208 and channel use module 210 to locate an unwritten series of access units that can store the volume of data associated with the write request and that efficiently uses, e.g., increases and/or maximizes, the number of I/O channels that are used in parallel during each track write process, i.e., the process of concurrently writing to one or more access units of the SSD via parallel I/O channels, to store the write-data in the respective access units. In one embodiment, channel alignment module 208 selects an unwritten series of access units that starts with an access unit associated with any I/O channel. The remaining access units are selected taking into account the I/O channel with which each access unit is associated. Access units, and the I/O channel associated with each, are selected such that each track write process writes to the SSD using an efficient number, e.g., an increased and/or maximum number, of I/O channels available, up until the final track write that completes writing the data segment using a number of I/O channels required to complete writing the data segment to the SSD. This can be accomplished by channel alignment module 208 by selecting, for each track written, access units associated with different I/O channels, until each I/O channel is in use or the required number of I/O channels needed to complete writing the data segment to the SSD have been allocated. Once an appropriate set of one or more access units has been selected, and operation of the process continues at S326.

At S326, solid-state drive controller 202 invokes memory access module 214 to store the write-data segment to the determined access units via parallel I/O channel communication with memory module 108, based on the respective access units and their respective I/O channels determined by any of the three alternate process branches described above, and operation of the process continues at S328.

At S328, solid-state drive controller 202 invokes memory address look-aside module 206 to update the logical block address look-aside table with the logical block addresses and corresponding access unit addresses associated with the write-data segment stored to memory module 108 at S326, and operation of the process continues at S330.

At S330, solid-state drive controller 202 invokes channel use module 210 to update the respective channel use tables, described above, to reflect the new active access units and newly inactivated access units for each channel affected by the write-data operation performed at S326. For example, the channel use tables are updated to indicate that newly written access units are in active use and to indicate that access units containing data that has been superseded by the newly written access units are inactive. Once the respective channel use tables have been updated, and operation of the process terminates at S332.

Figure 5:
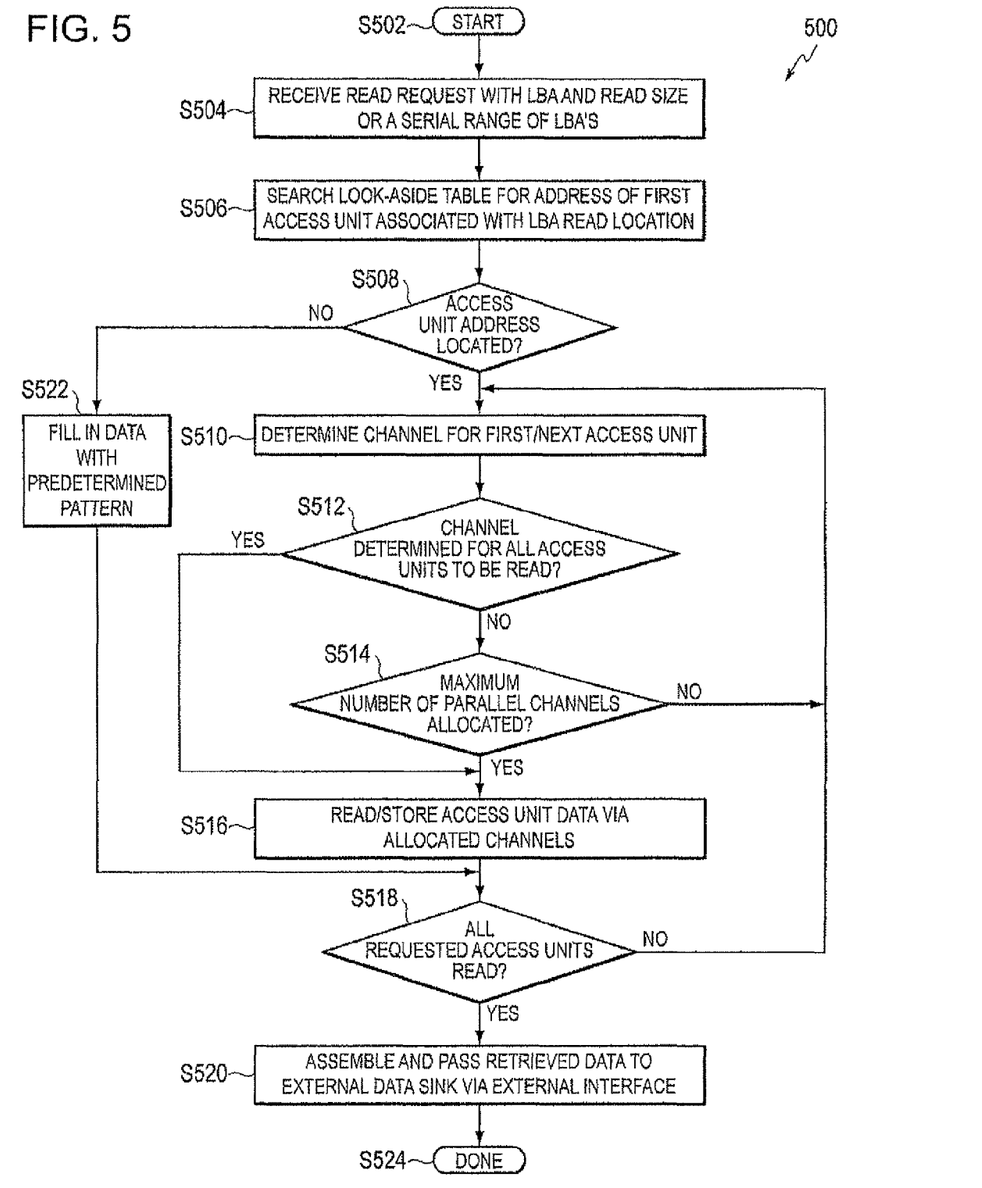
FIG. 5 is a flow-chart of an data read process that uses an embodiment of the described solid-state drive access unit access/data retrieval approach.

FIG. 5 is a flow-chart of a data read process that uses an embodiment of the described solid-state drive access unit access/data retrieval approach. As shown in FIG. 5, operation of process 500 begins at S502 and proceeds to S504.

At S504, solid-state drive controller 202 may receive an indication from parsing module 204 that a read request with a logical block address read location and read-data segment size has been received, e.g., from an external data-source/data-sink device via external interface 102 and the inbound FIFO buffer, as described above, and operation of the process continues at S506.

At S506, solid-state drive controller 202 may instruct memory address look-aside module 206 to search the memory address look-aside table to determine an access unit address that corresponds to the received logical block address read location, and operation of the process continues at S508.

At S508, if memory address look-aside module 206 determines that logical block address is currently mapped to an addressable access unit that is actively in use to store current data, operation of the process continues at S510; otherwise, operation of the process continues at S522.

At S510, solid-state drive controller 202 invokes channel alignment module 208 to determine the I/O channel associated with the first/next access unit associated with the read-data segment, and operation of the process continues at S512.

At S512, if solid-state drive controller 202 determines that an I/O channel has been determined for all access units associated with the read-data segment, operation of the process continues at S516; otherwise, operation of the process continues at S514.

At S514, if solid-state drive controller 202 determines that a threshold number of channels that can be read in parallel have been allocated, operation of the process continues at S516; otherwise, operation of the process continues at S510.

At S516, solid-state drive controller 202 invokes memory access module 214 to read the respective access units via parallel I/O channel communications with the access units stored in memory module 108 via the I/O channels determined at step S510, and operation of the process continues at S518.

At S518, if solid-state drive controller 202 determines that all access units associated with the read-data segment have been read, operation of the process continues at S520; otherwise, operation of the process continues at S510.

At S520, solid-state drive controller 202 assembles a read-response message that includes a read-data segment assembled from the data retrieved from the respective access units via the respective I/O channel connections and passes the read response message to the external data-source/data-sink device e.g., via the outbound FIFO buffer and external interface 102, as described above, and operation of the process terminates at S524.

Returning now to discuss an alternate process flow starting at S508, if memory address look-aside module 206 determines that logical block address is not currently mapped to an addressable access unit that is actively in use to store current data, operation of the process continues at S522.

At S522, solid-state drive controller 202 fills in the data with a predetermined pattern that is acceptable to the external data-source/data-sink device requesting the stored data, e.g., a pattern specified in the protocol used by the external data-source/data-sink device and SSD 100, and operation of the process continues at S518.

It is noted that the work-flow and functional operations described above with respect to solid-state drive 100 may be implemented using any combination of hardware, software, and/or firmware. For example, in one embodiment, solid-state drive control module 104, error correction module 106 and significant portions of external interface 102 and buffer memory 110, may be implemented within a single integrated circuit system on a chip (SOC). In such an embodiment, significant portions of the processing performed by solid-state drive control module 104, error correction module 106 and external interface 102 may be performed by an integrated circuit SOC microprocessor operated under the control of executable instructions that are stored in firmware and loaded to memory prior to execution. In other embodiments, one of more of the work-flows and operational functions described above may be performed by a different combination of hardware, firmware and software.

It is noted that the described embodiments of a solid-state drive, the described embodiments of a solid-state drive access unit allocation/data storage approach, and/or the described embodiments of a solid-state drive access unit access/data retrieval approach that improve solid-state drive data retrieval efficiency can be included in a wide range of end-user devices. Such end-user devices may include, but are not limited to, cameras, video cameras, cell phones, handheld personal computing devices, laptop personal computing devices, desktop personal computing devices, home appliances, video equipment including video recording and/or playback devices, audio equipment including audio recording and/or playback devices, such as MP3 players, etc., and global positioning system location devices.

For purposes of explanation in the above description, numerous specific details are set forth in order to provide a thorough understanding of the described embodiments of a solid-state drive, a solid-state drive access unit allocation/data storage approach, and a solid-state drive access unit access/data retrieval approach that improve solid-state drive data retrieval efficiency. It will be apparent, however, to one skilled in the art based on the disclosure and teachings provided herein that the described embodiments may be practiced without these specific details. In other instances, well-known structures and devices are shown in block diagram form in order to avoid obscuring the features of the described embodiments.

While the embodiments of the solid-state drive, the solid-state drive access unit allocation/data storage approach, and the solid-state drive access unit access/data retrieval approach that improve solid-state drive data retrieval efficiency have been described in conjunction with the specific embodiments thereof, it is evident that many alternatives, modifications, and variations will be apparent to those skilled in the art. Accordingly, the described embodiments, as set forth herein, are intended to be illustrative, not limiting. There are changes that may be made without departing from the spirit and scope of the invention.

What is claimed is:

1. A data storage device, comprising:
   a solid-state memory organized into a plurality of access units, each access unit associated with one of a plurality of I/O channels; and
   a controller configured to control a transfer of data received from an interface module to the solid-state memory via one or more of the I/O channels and assign portions of the data to each of the access units such that at least one of the I/O channels are associated with a first portion of the data before the at least one of the I/O channels are associated with a second portion of the data.

2. The data storage device of claim 1, wherein each of the access units are associated with a predetermined solid-state memory address.

3. The data storage device of claim 1, wherein the one of the I/O channels is predetermined.

4. The data storage device of claim 1, wherein the interface module is configured to receive the data from a data-source that specifies a storage location for the data in the data storage device using a logical block address.

5. The data storage device of claim 1, wherein the controller is further configured to assign portions of the data to each of the access units such that each I/O channel is associated with a first portion of the data before any I/O channel is associated with a second portion of the data.

6. The data storage device of claim 1, further comprising:
   a memory access firmware configured to transfer first portions of the data to the respective access units via concurrent transmissions via respective I/O channels, prior to transferring second portions of the data to the respective access units via concurrent transmissions via the respective I/O channels.

7. The data storage device of claim 1, wherein the solid-state memory is a flash memory.

8. The data storage device of claim 1, wherein the access units are assigned to a respective I/O channel based on a fixed interval of the access units.

9. The data storage device of claim 1, further comprising:
   a channel use firmware configured to maintain a channel use table that tracks a status of the access units assigned to a respective I/O channel.

10. The data storage device of claim 1, further comprising:
    a memory address look-aside firmware configured to maintain a translation look-aside table that maps a logical block address to a solid-state memory access unit that stores a current data associated with the logical block address.

11. A method of writing data to a storage device, comprising:
    organizing a solid-state memory into a plurality of access units, each access unit associated with one of a plurality of I/O channels;
    controlling, by a controller, a transfer of data received from an interface module to the solid-state memory via one or more of the I/O channels; and
    assigning portions of the data to each of the access units such that at least one of the I/O channels are associated with a first portion of the data before the at least one of the I/O channels are associated with a second portion of the data.

12. The method of claim 11, wherein each of the access units are associated with a predetermined solid-state memory address.

13. The method of claim 11, wherein the one of the I/O channels is predetermined.

14. The method of claim 11, further comprising:
    receiving the data by the interface module from a data-source that specifies a storage location for the data in the data storage device using a logical block address.

15. The method of claim 11, further comprising:
    assigning portions of the data to each of the access units such that each I/O channel is associated with a first portion of the data before any I/O channel is associated with a second portion of the data.

16. The method of claim 11, further comprising:
    transferring, by a memory access firmware, first portions of the data to the respective access units via concurrent transmissions via respective I/O channels, prior to transferring second portions of the data to the respective access units via concurrent transmissions via the respective I/O channels.

17. The method of claim 11, wherein the solid-state memory is a flash memory.

18. The method of claim 11, wherein the access units are assigned to a respective I/O channel based on a fixed interval of the access units.

19. The method of claim 11, further comprising:
    maintaining, by a channel use firmware, a channel use table that tracks a status of the access units assigned to a respective I/O channel.

20. The method of claim 11, further comprising:
    maintaining, by a memory address look-aside firmware, a translation look-aside table that maps a logical block address to a solid-state memory access unit that stores a current data associated with the logical block address.

* * * * *